United States Patent
Becker et al.

(10) Patent No.: US 6,411,805 B1
(45) Date of Patent: *Jun. 25, 2002

(54) SYSTEM AND METHOD FOR A NETWORK-BASED CALL CONTINUATION SERVICE

(75) Inventors: Steven C. Becker; Christine S. Chaney; Shaun McNerney, all of Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,980

(22) Filed: Jun. 5, 1997

(51) Int. Cl.⁷ .............................. H04M 3/42
(52) U.S. Cl. ............. 455/414; 379/201; 379/209; 379/209.01; 379/210; 379/266
(58) Field of Search .................. 455/414, 415, 455/417, 445, 458, 459, 550, 461; 379/265, 266, 201, 207, 208, 209, 210, 309, 67.1, 69, 88.23, 209.01, 210.01

(56) References Cited

U.S. PATENT DOCUMENTS

| | | | |
|---|---|---|---|
| 5,155,761 A | * 10/1992 | Hammond | 379/266 |
| 5,185,782 A | * 2/1993 | Srinivasan | 379/266 |
| 5,206,903 A | 4/1993 | Kohler et al. | |
| 5,268,957 A | * 12/1993 | Albrecht | 379/209 |
| 5,311,574 A | * 5/1994 | Livanos | 379/309 |
| 5,384,841 A | * 1/1995 | Adams et al. | 379/309 |
| 5,533,100 A | * 7/1996 | Bass et al. | 379/209 |
| 5,535,256 A | 7/1996 | Maloney et al. | |
| 5,625,682 A | * 4/1997 | Gray et al. | 379/266 |
| 5,742,674 A | * 4/1998 | Jain et al. | 379/209 |
| 5,761,289 A | * 6/1998 | Keshav | 379/201 |
| 5,761,507 A | 6/1998 | Govett | |
| 5,778,060 A | 7/1998 | Otto | |
| 5,793,861 A | 8/1998 | Haigh | |
| 5,826,014 A | 10/1998 | Coley et al. | |
| 5,838,682 A | 11/1998 | Dekelbaum et al. | |
| 5,884,032 A | 3/1999 | Bateman et al. | |
| 5,933,492 A | 8/1999 | Turovski | |
| 6,130,933 A | 10/2000 | Miloslavsky | |
| 6,163,536 A | 12/2000 | Dunn et al. | |
| 6,192,050 B1 | 2/2001 | Stovall | |

OTHER PUBLICATIONS

WebLine Comm. Debuts Powerful Software Solution For Interactive Telebusiness, Press Release [Online]. WebLine Comm. Corp., Sep. 8, 1997 [retrieved on Nov. 5 1995]. Retrieved from the Internet: <URL: http:www.webline.com/news/press/1997/9–8–97, htm>.

Harry Newton, Newton's Telecom Dictionary, Nov. 1994, Flatiron Publishing Inc., 8$^{th}$ Ed., pp. 106, ISBN 0–936648–60–0.

* cited by examiner

Primary Examiner—Nay Maung
Assistant Examiner—Quochien B. Vuong

(57) ABSTRACT

The present invention is a system and method for continuing a telephone call placed by a caller to a call center in a telecommunications network. When a caller attempts to make a call to a call center that is unavailable, the system obtains callback information for the caller including a telephone number where the caller can be reached. The call is then ended. When the call center is again available, the system continues the call by placing a call to the caller at said telephone number, placing a call to the destination, and joining the two calls.

32 Claims, 7 Drawing Sheets

SYSTEM AND METHOD FOR A NETWORK-BASED CALL CONTINUATION SERVICE

CROSS-REFERENCE TO RELATED APPLICATIONS

This application is related to commonly-owned, co-pending applications entitled "System and Method for Call Park and Transfer in a Telecommunications Network" having application No. 08/796,840, filed on Feb. 7, 1997, now abandoned and "Network Call Parking Manager" having application No. 08/796,839 filed Feb. 7, 1997, now U.S. Pat. No. 6,044,144.

BACKGROUND OF THE INVENTION

1. Field of the Invention

The present invention relates generally to computer telephony, and more particularly to continuing a telephone call placed on a telephone network.

2. Related Art

The proliferation of call centers within many different industries has introduced new requirements into the functionality of telecommunications networks. A call center is typically a platform and location used by a business for customer services, operator services, telemarketing, or other such purposes. At a typical call center, individuals known as "agents" interact with callers to accomplish these purposes. Callers commonly access a call center by dialing a 1-8XX number, though any type of telephone number can be used.

Despite recent advances in call center technology, it is not uncommon for a call center to become so overburdened with incoming calls that callers are forced to wait for long periods of time to be connected to a call center agent. In some cases these periods are so long that callers hang up.

Such long wait times result in increased telephone costs for the call center, inconvenience to the caller, the perception by callers of poor service, and the loss of calls and the business associated with those calls.

SUMMARY OF THE INVENTION

The present invention is a system and method for continuing a telephone call placed by a caller to a call center in a telecommunications network. As described below, the present invention can be used to continue calls to other types of destinations. When a caller attempts to make a call to a call center that is unavailable, the present invention can be used to continue the call. The system obtains callback information for the caller, where the callback information includes a telephone number where the caller can be reached. The caller can then end the call. When the call center is again available, the system continues the call by placing a call to the caller at the callback telephone number, placing a call to the destination, and joining the two calls.

In a preferred embodiment, calls to be continued are placed in a call queue, and are continued, in first-in first-out order. In one embodiment, calls can be prioritized and continued in priority order. In another embodiment, the caller can specify the time at which the call should be continued.

One advantage of the present invention is that it permits a caller to hang up when the destination is unavailable, and have the call automatically continued when the destination is again available.

Another advantage of the present invention over conventional approaches is that it can be used with call destinations that do not have outbound calling capability.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
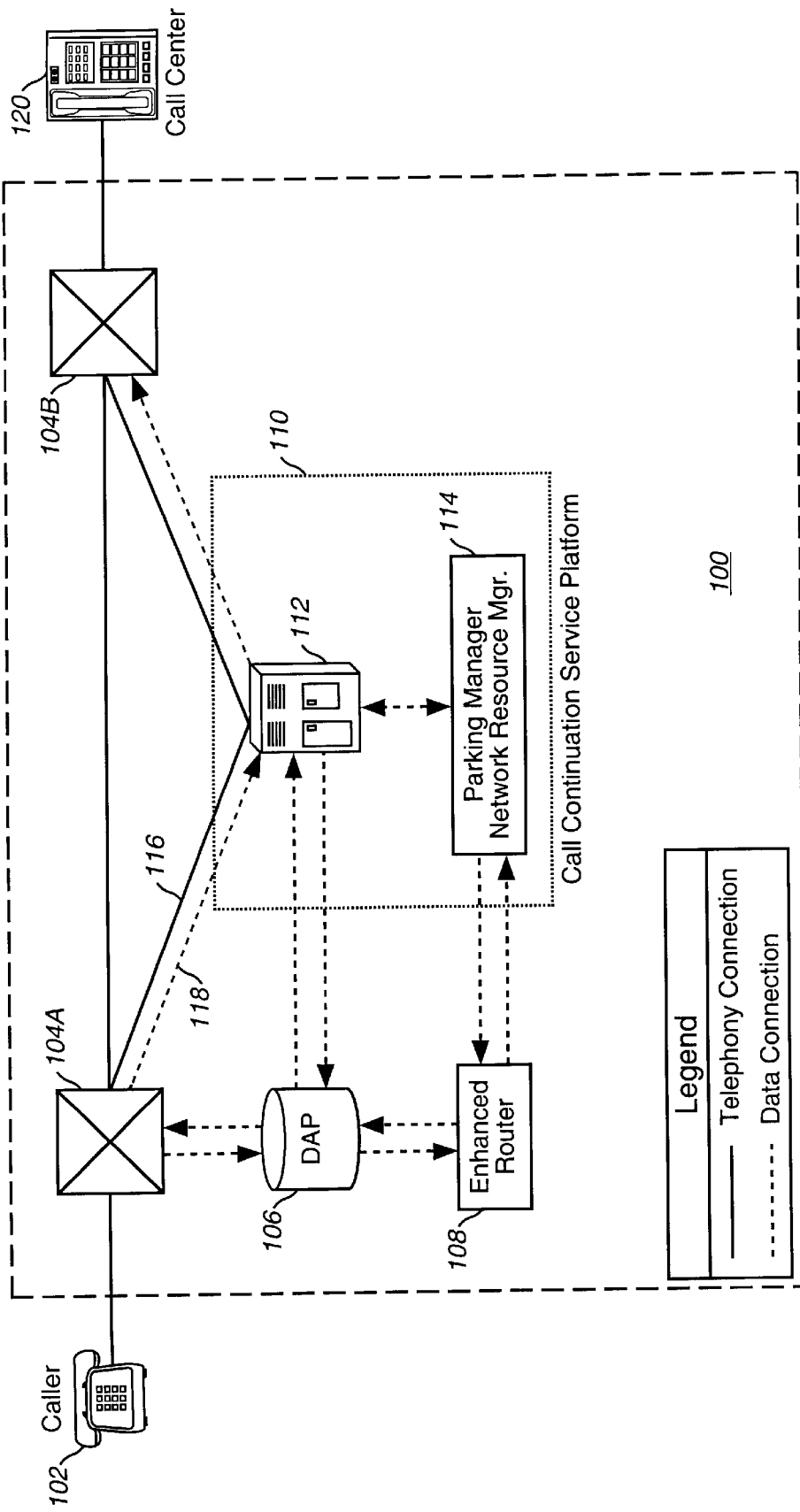
FIG. 1 is a block diagram illustrating an example system architecture for a preferred embodiment of the present invention.

FIG. 1 is a block diagram illustrating an example system architecture for a preferred embodiment of the present invention. In FIG. 1, the interconnections between elements are depicted as either solid or dashed lines. Solid lines depict trunks bearing call traffic, while dashed lines depict data links used to implement call control functions.

Referring to FIG. 1, the present invention uses a telecommunications switch network 100 to receive calls from a call originator 102 and deliver them to a customer's call center 120. A call originator 102 represents the point of entry of a telephone call to the switch network 100. Call originator 102 may be a local exchange carrier (LEC), a caller's dedicated access line (DAL) to the switch network 100, another switch network of another carrier, or any other means for originating a call on switch network 100.

Call center 120 is typically a platform and location used by a business for customer services, operator services, telemarketing, or other such purposes. It is commonly reached with a 1-8XX number, though any type of telephone number can be used. It is also common for a business to employ multiple call centers 120 for a single 1-8XX number. In addition to receiving calls from switch network 100, it may also be capable of placing outbound calls to switch network 100 via traffic trunks.

Network 100 includes switches 104A,B, data access point (DAP) 106, enhanced call router 108, and Call Continuation Service (CCS) platform 110. In a preferred embodiment, CCS platform 110 includes a parking platform 112 and a parking manager 114. In a preferred embodiment, parking manager 114 is a software package implemented on a hardware platform. One implementation of parking manager 114 is disclosed in a copending, commonly-owned application entitled "Network Call Parking Manager" having application number (to be assigned, Attorney Docket Number COS-96-040), filed Feb. 2, 1997, which is incorporated herein by reference in its entirety.

For convenience, the preferred embodiment of the present invention is discussed in terms of a telephone call placed by a caller to a toll-free 1-8XX telephone number for a call center destination. However, the present invention can be employed to continue calls placed to other types of telephone numbers for other types of destinations, as would be apparent to one skilled in the relevant art. In addition, other uses of call continuation are contemplated, as discussed in detail below. In the remainder of this disclosure, the term "caller" refers to the originator of the call, and the term "customer" refers to the intended call center destination of the call placed by the caller.

Figure 2:
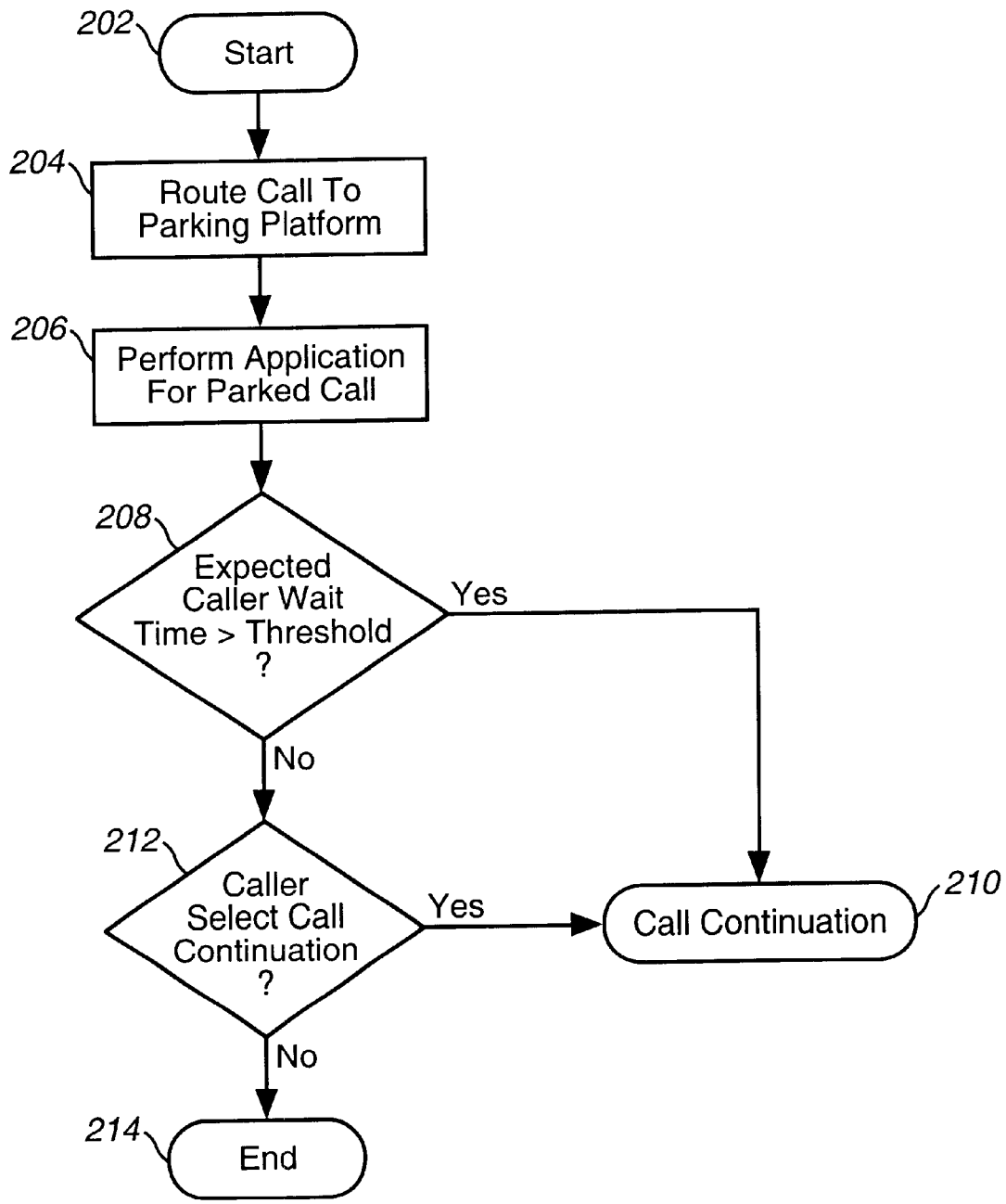
FIG. 2 is a flowchart illustrating a process performed by the present invention according to a preferred embodiment.

FIG. 2 is a flowchart illustrating a process performed by the present invention according to a preferred embodiment. The process begins when a caller at call originator 102 places a call to a toll-free 1-8XX telephone number for call center destination 120. If call center destination 120 is determined to be unavailable, the call is "parked" at parking platform 112.

One way to park a call is to hold the call on a network element, such as parking platform 112. One type of component that can be used to implement parking platform 112 is generally referred to as an audio response unit (ARU), and is also known as an interactive voice response (IVR) unit. An ARU is typically a microprocessor or midrange computer that is equipped with telephony ports. An ARU can be used for such applications as caller interactive menu routing services.

One method of determining the availability of a call center destination is disclosed in a commonly-owned, copending application entitled "System and Method for Call Park and Transfer in a Telecommunications Network" having application number (to be assigned, Attorney Docket Number COS-95-010), filed Feb. 2, 1997, which is incorporated herein by reference in its entirety. Other methods of determining the availability of a destination may be employed without departing from the spirit and scope of the present invention, as would be apparent to one skilled in the relevant art.

Referring again to FIG. 2, a normal call flow is used to extend the call to CCS platform 110, as shown in a step 204. For convenience, one such call flow is described below. Other call flows that result in the call being parked at parking platform 112 can be employed, as would be apparent to one skilled in the relevant art.

The normal call flow begins when call originator 102 dials a 1-8XX number for call center 120. An originating switch 104A receives the call and, based on the dialed number, issues a query for call routing to a data access point (DAP) 106. DAP 106 performs one or more database look-ups to determine the routing for the call.

Because multiple call centers can be accessed by a single 1-8XX number, enhanced call routing is performed. Therefore, DAP 106 determines that the call query should be forwarded to an enhanced call router 108. Enhanced call router 108 (referred to as a "call center router" in related patent application number (to be assigned, Attorney Docket Number COS-95-010), filed Feb. 2, 1997, performs rules-based routing for call centers and other destinations as a subscribed service. Enhanced call router 108 determines that there are no available agents at a call center 120, and that the call must be parked. Enhanced call router 108 queries a parking manager 114 for an available parking slot. In a preferred embodiment, a parking slot is a voice port (e.g., a DS-0 telephony port) on a parking platform 112.

Parking manager 114 determines an available parking slot on a parking platform 112 and responds to enhanced call router 108 with a network routing address for that parking platform 112. Enhanced call router 108 forwards this response to DAP 106. DAP 106 responds to originating switch 104A with instructions to route the call to an available parking slot (i.e., DS-0 port) on parking platform 112.

In response to the routing instructions, originating switch 104A routes the call to parking platform 112 via voice trunk 116, as shown in a step 204. Originating switch 104A sends signaling information, such as caller automatic number identification (ANI), via an SS7 link 118. This information can be used to match the call to a parking reservation and/or application to be performed for the call on parking platform 112.

Parking platform 112 receives and parks the call while parking platform 112 performs an application for the call, as shown in a step 206. The application can include, for example, playing a recorded announcement or greeting for the caller and presenting a menu of options. Meanwhile, enhanced call router 108 continuously monitors the intended call center 120 for availability.

In a preferred embodiment, the expected wait time for a parked call is determined. Expected call wait time can be determined based on the number of calls in queue ahead of the current call, the number of resources at the call center 120, and the average call center processing time per call. In one embodiment, call continuation is initiated automatically when the expected wait time for the parked call exceeds a predetermined threshold, as shown in steps 208 and 210. This operation prevents calls from being held on the CCS platform 110 for an excessive amount of time. In one embodiment, expected call wait time is determined by enhanced router 108.

If the expected call wait time is less than the predetermined threshold, then CCS platform 110 can simply present the caller with an option to use the call continuation service. The caller can select this option, for example, by entering caller-entered digits when prompted.

If the caller elects to use the call continuation service, the CCS platform 110 performs call continuation, as shown in steps 212 and 210. If not, the network element of the CCS platform 110 (here, parking platform 112) continues with a normal call flow in accordance with a service application, such as call parking. For example, the caller can be placed in a queue to wait for the next available call center agent.

Figure 3:
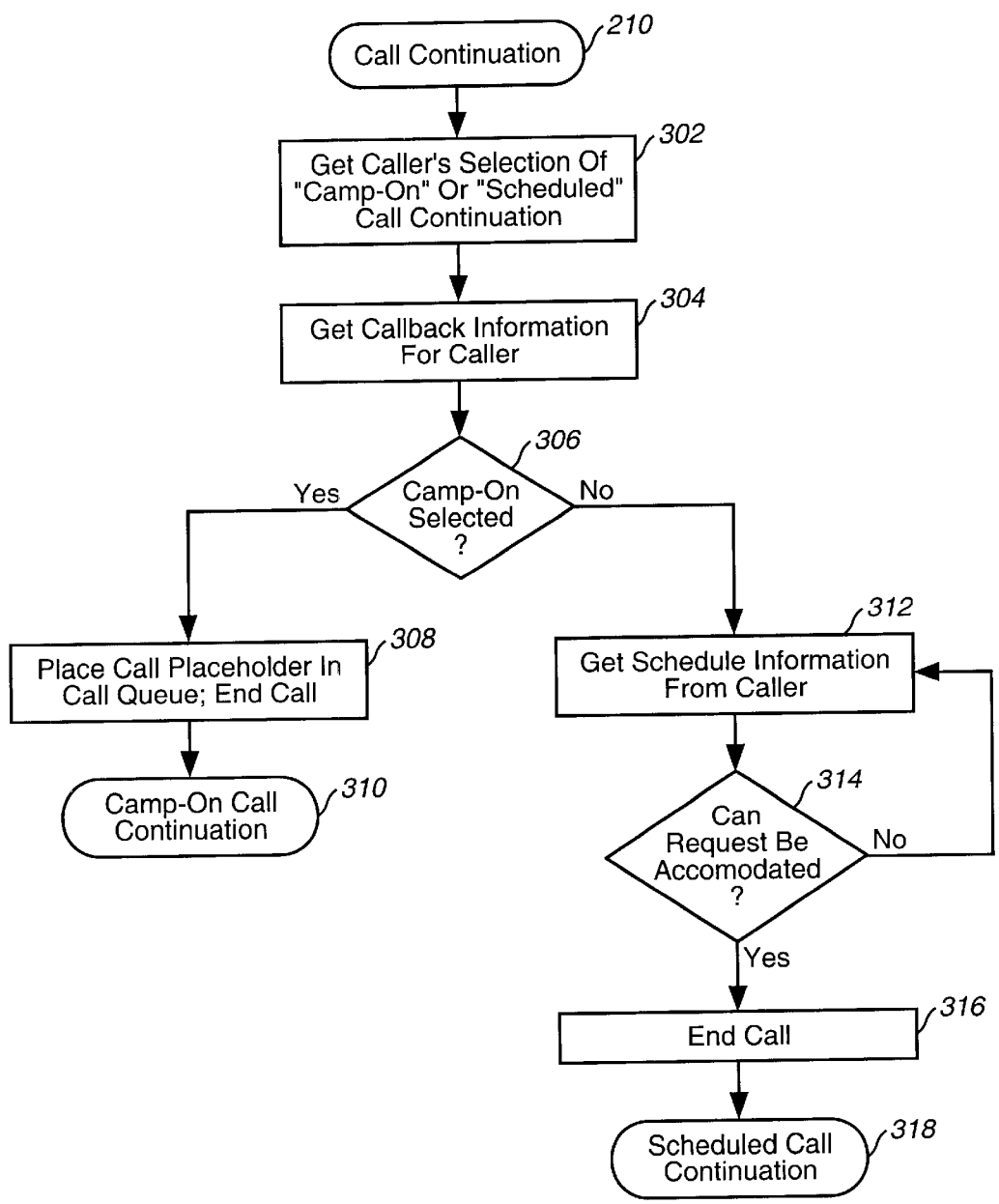
FIG. 3 depicts a flowchart illustrating a call continuation process according to a preferred embodiment of the present invention.

FIG. 3 depicts a flowchart illustrating a call continuation process according to a preferred embodiment of the present invention. This process corresponds to step 210 of FIG. 2.

In a step 302, the CCS platform 110 prompts the caller to select either a "camp-on" or a "scheduled" call continuation. A camp-on continuation call will keep the caller's place in queue, after the caller hangs up, and will place a call to the caller when the caller reaches the front of the queue. A scheduled continuation call will place a call to the caller at a time specified by the caller. In a preferred embodiment, the caller enters his selection using caller-entered digits.

In a step 304, CCS platform 110 prompts the caller for callback information. In a preferred embodiment, the callback information includes the number at which the caller can be reached. In one embodiment, the callback information is automatically collected from a signal such as ANI. In another embodiment, the callback information is collected from caller-entered digits. The callback information can be collected in other ways without departing from the spirit and scope of the present invention, as would be apparent to one skilled in the relevant art. In a step 306, CCS platform 110 determines whether the caller selected camp-on or scheduled call continuation.

If the caller selected a camp-on continuation call, then in step 308, the CCS platform 110 places a placeholder for the caller in the call queue for the intended destination. In a preferred embodiment, this call queue is managed by parking manager 114. CCS platform 110 then ends the call and allows the caller to hang up. In a step 310, a camp-on call continuation is performed, as described below with reference to FIG. 5.

If in step 302 the caller selected a scheduled continuation call, then in a step 312, CCS platform 110 prompts the caller for schedule information. The schedule information can be collected from the caller in many ways, as would be apparent to one skilled in the relevant art. In a preferred embodiment, this schedule information includes the time at which the caller wishes to be called to continue the call. The schedule information can also include other information regarding callback time, such as day of week, date, and the like, as would be apparent to one skilled in the relevant art.

In a step 314, CCS platform 10 determines whether the schedule request can be accommodated. For example, if the destination is a call center that operates only from 8:00 am to 5:00 pm, and the caller has requested a continuation call at 6:00 pm, CCS platform 110 determines that the request cannot be accommodated, and prompts the caller for another request.

If the request can be accommodated, then in a step 316, CCS platform 110 ends the call and allows the caller to hang up. In a step 318, a scheduled call continuation is performed, as described below with reference to FIG. 4.

In one embodiment of the present invention, calls continued for the customer can be prioritized. In this embodiment, a specific priority is assigned to each call to be continued. The level of priority assigned to a call can be selected on the basis of calling number, called number, level of service to which the caller subscribes, and the like, as would be apparent to one skilled in the relevant art.

In this embodiment, the priority of a call is used to determine the order in which calls are continued. In one embodiment, placeholders are placed in the call queue in priority order, so that calls with the highest priority are continued first.

In another embodiment, a separate prioritized call queue is employed. Placeholders for prioritized calls are placed in the prioritized call queue, and placeholders for unprioritized calls are placed in an unprioritized call queue. In this embodiment, calls with placeholders in the prioritized call queue are continued before calls with placeholders in the unprioritized call queue. Calls with placeholders in the prioritized call queue are continued in priority order.

Figure 4:
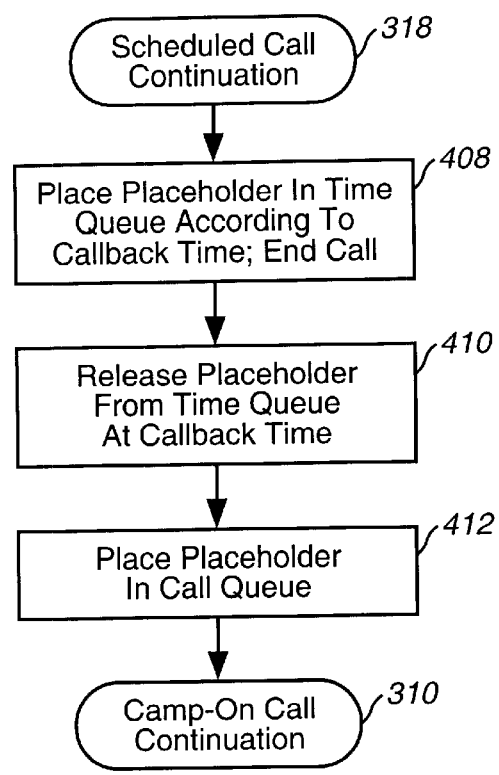
FIG. 4 depicts a flowchart illustrating a process for implementing a scheduled call continuation according to a preferred embodiment of the present invention.

FIG. 4 depicts a flowchart illustrating a process for implementing a scheduled call continuation according to a preferred embodiment of the present invention. This process corresponds to step 318 of FIG. 3.

When a caller selects scheduled call continuation, CCS platform 110 places a placeholder for the call in a time queue according to the schedule information collected from the caller, as shown in a step 408. In a preferred embodiment, each placeholder includes the callback time selected by the caller, and the time queue stores placeholders in time order according to callback times. In a preferred embodiment, this time queue is managed by parking manager 114. CCS platform 110 then ends the call and allows the caller to hang up.

A placeholder is released from the time queue at its callback time, as shown in a step 410. When a placeholder is released from the time queue, it is placed in the call queue described above. The camp-on call continuation process 414 is then performed. In one embodiment, calls are prioritized, and placeholders are placed in the call queue in priority order, as described above.

Figure 5:
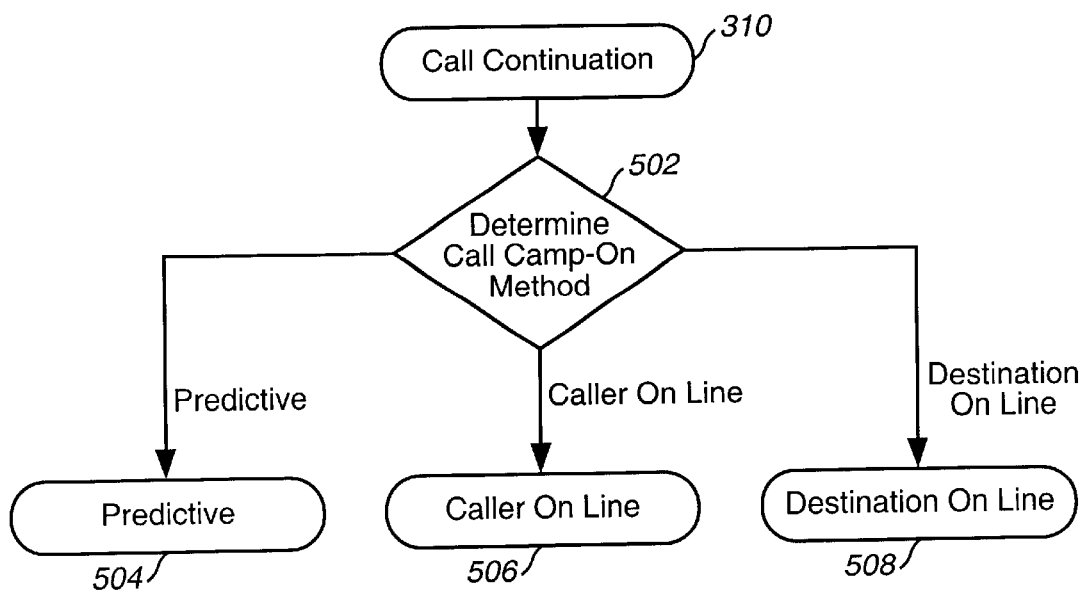
FIG. 5 depicts a flowchart illustrating a process for implementing a camp-on call continuation according to a preferred embodiment of the present invention.

FIG. 5 depicts a flowchart illustrating a process for implementing a camp-on call continuation according to a preferred embodiment of the present invention. This process corresponds to step 310 of FIGS. 3 and 4.

In a step 502, CCS platform 110 determines which one of the many camp-on methods to use. In one embodiment, the camp-on method is selected by the customer. The camp-on method can be determined by CCS platform 110 based on the called number (i.e., the telephone number dialed by the customer), the calling number, and the like. In one embodiment, the called number is identified using a dialed number identification service (DNIS) signal. Although many different types of camp-on methods can be used, three are shown for illustrative purposes. These three methods are termed "predictive" camp-on method 504 (discussed below with reference to FIG. 6), "caller on line" camp-on method 506 (discussed below with reference to FIG. 7), and "destination on line" camp-on method 508 (discussed below with reference to FIG. 8).

Figure 6:
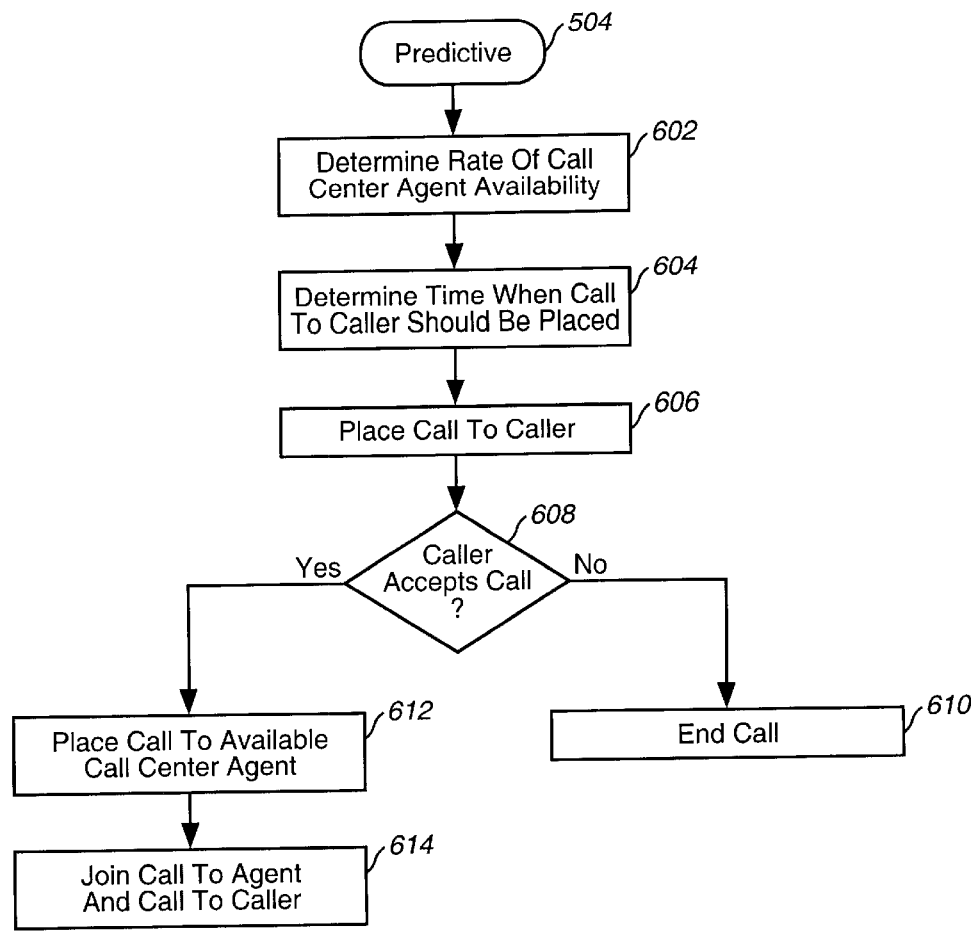
FIG. 6 depicts a flowchart illustrating a process for implementing a "predictive" camp-on call continuation according to a preferred embodiment of the present invention.

FIG. 6 depicts a flowchart illustrating a process for implementing a "predictive" camp-on call continuation according to a preferred embodiment of the present invention. This process corresponds to step 504 of FIG. 5. This method predicts when a call center agent will be available, then places a call to the caller in time to connect to that agent when that agent becomes available. Although this method is described in terms of a call center staffed by agents, it can also be extended to other types of queuing call destinations (i.e., call destinations that queue incoming calls) without departing from the spirit and scope of the present invention. Thus, one advantage of "predictive" camp-on call continuation is that it minimizes both the wait time for the caller and the idle time for the agent.

Referring to FIG. 6, CCS platform 110 determines the rate of call center agent availability, as shown in a step 602. In one embodiment, call center agent availability can be determined by monitoring data made available by a call center automatic call distributor (ACD) and provided to CCS platform 110 via a computer/telephony interface (CTI). Such a system is described in related patent application number (to be assigned, Attorney Docket Number COS-95-010), filed Feb. 2, 1997.

Based on the rate of call center agent availability determined in step 602, CCS platform 110 determines the time when a call to the caller should be placed, as shown in a step 604. Steps 602 and 604 together represent a predictive dialing algorithm. Many such algorithms exist and are well-known in the art.

In a step 606, CCS platform 110 places a call to the caller at the time determined in step 604. CCS platform 110 places the call to the caller using the callback information obtained in step 304 of FIG. 3.

In a step 608, CCS platform 110 determines whether the caller accepts the call placed in step 606. If the caller does not answer, or answers and elects not to accept the call, then CCS platform 110 ends the call, as shown in a step 610. In another embodiment, if the caller does not accept the call, then the call is continued at a later time.

However, if the caller answers and elects to accept the call, then CCS platform 110 places a call to an available call center agent, as shown in a step 612. A call center agent should be available in accordance with the predictive dialing algorithm employed in steps 602 and 604. When a call center agent has answered the call, CCS platform 110 joins the call placed to the call center agent and the call placed to the caller to complete the call, as shown in a step 614.

One advantage of the present invention over conventional approaches is that call between the CCS platform and the destination is placed by the CCS platform. Because the destination is not required to place calls, the destination need not have the capability to place calls. In most conventional approaches, the destination makes outbound calls. Thus to use these conventional approaches, a destination must have the capability to place outbound calls, and the destination's agents must be trained in outbound calling.

Joining two calls can be accomplished by several methods that are well-known in the art. For example, the two calls could be conferenced together. As another example, the two calls could be bridged by a network switch.

Figure 7:
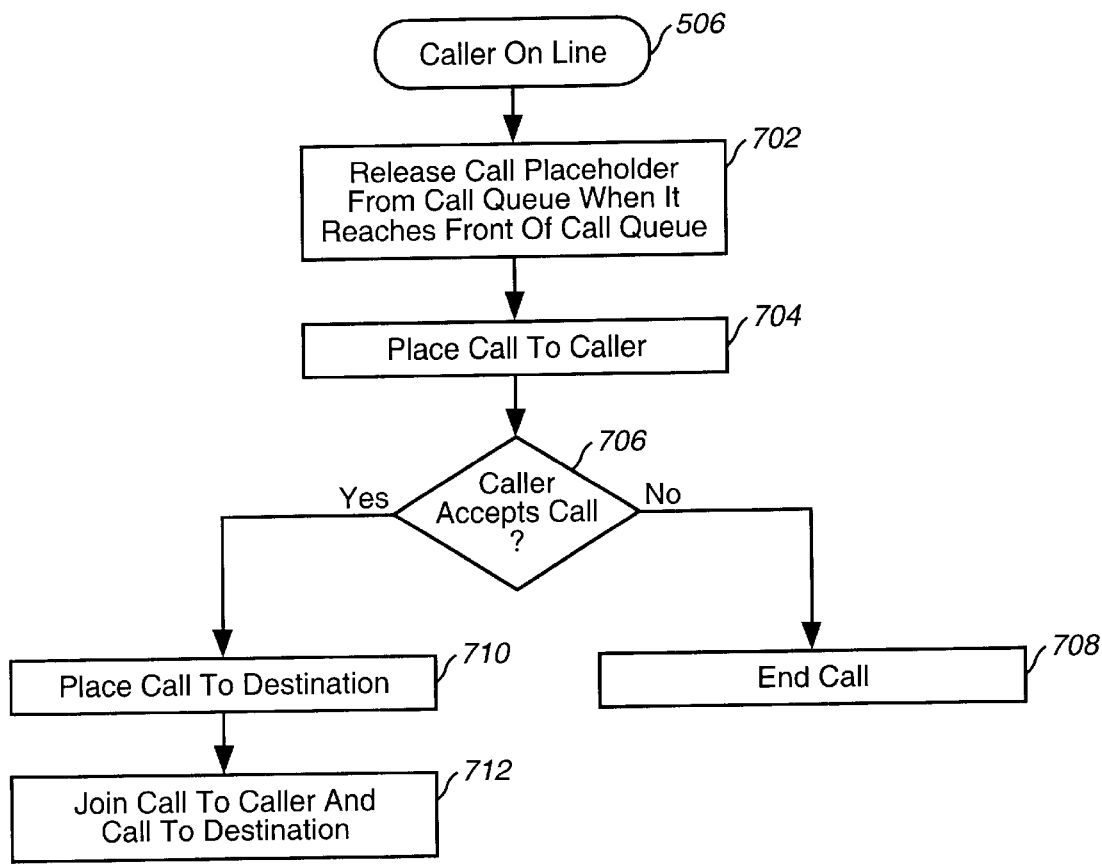
FIG. 7 depicts a flowchart illustrating a process for implementing a "caller on line" camp-on call continuation according to a preferred embodiment of the present invention.

FIG. 7 depicts a flowchart illustrating a process for implementing a "caller on line" camp-on call continuation according to a preferred embodiment of the present invention. This process corresponds to step 506 of FIG. 5. This method places a call to the caller when the caller's placeholder reaches the front of the call queue, and then attempts to reach the destination. Thus, one advantage of "caller on line" camp-on call continuation is that it minimizes the time when agents are idle. In a preferred embodiment, a placeholder is released from the call queue when it reaches the front of the call queue, as shown in a step 702.

In a step 704, CCS platform 110 places a call to the caller associated with the placeholder that was released in step 702. CCS platform 110 places the call to the caller using the callback information obtained in step 304.

In a step 706, CCS platform 110 determines whether the caller accepts the call. If the caller does not accept the call or does not answer, CCS platform 110 ends the call in step 708. In another embodiment, if the caller does not accept the call, then the call is continued at a later time.

However, if the caller accepts the call, then CCS platform 110 places a call to an the destination, as shown in a step 710. CCS platform 110 then joins the call placed to the caller and the call placed to the agent, as shown in a step 712.

Figure 8:
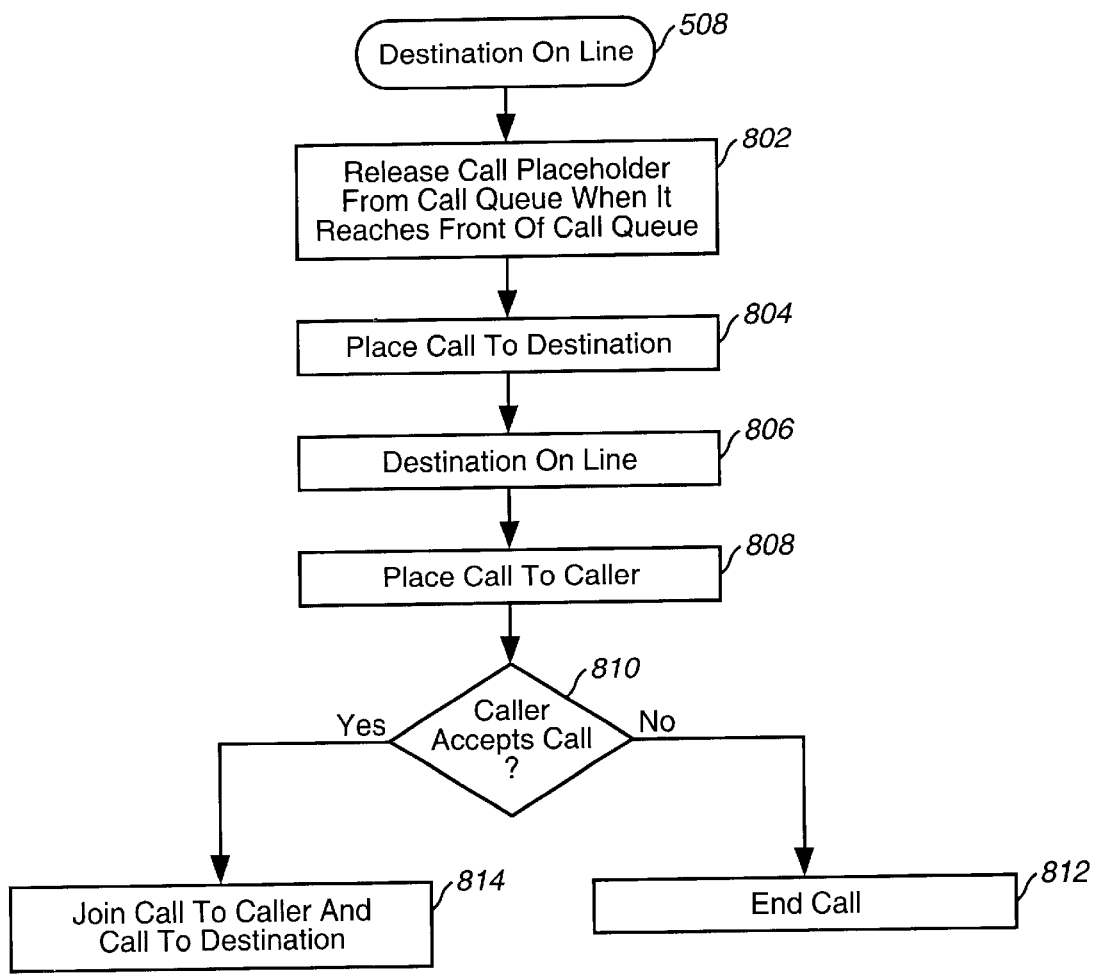
FIG. 8 depicts a flowchart illustrating a process for implementing a "destination on line" camp-on call continuation according to a preferred embodiment of the present invention.

FIG. 8 depicts a flowchart illustrating a process for implementing a "destination on line" camp-on call continuation according to a preferred embodiment of the present invention. This process corresponds to step 508 of FIG. 5. This method places a call to the caller after the destination has been reached, thus minimizing the wait-time for the caller. In a preferred embodiment, a placeholder is released from the call queue when it reaches the front of the call queue, as shown in a step 802.

In a step 804, CCS platform 110 places a call to the destination associated with the placeholder that was released in step 802. In a step 806, the destination answers and CCS platform 110 determines that the destination is on line. CCS platform 110 then places a call to the caller associated with the placeholder that was released in step 802, as shown in a step 808. CCS platform 110 places the call to the caller using the callback information obtained in step 304.

In a step 810, CCS platform 110 determines whether the caller accepts the call. If the caller does not accept the call or does not answer, CCS platform 110 ends the call, as shown in a step 812. In another embodiment, if the caller does not accept the call, then the call is continued at a later time. However, if the caller accepts the call, then CCS platform 110 joins the call placed to the caller and the call placed to the destination, as shown in a step 814.

In an alternative embodiment, CCS platform 810 does not determine whether the caller accepts the call, but instead automatically joins the call placed to the caller and the call placed to the destination, and permits the destination to determine whether the caller has accepted the call.

While the present invention has been described in terms of continuing a call placed to a call center, the present invention can also be used in conjunction with a number of services. One such service is call parking, which is disclosed in application number (to be assigned, Attorney Docket Number COS-95-010), filed Feb. 2, 1997. The present invention can also be used in a number of applications.

For example, the present invention can be used to continue a call placed to any destination, including residential and local services. For example, when a class 5 switch detects a busy condition at a call destination, the call is routed to a voice response unit for call continuation.

As another example, the present invention can be used to continue a call placed to a destination in a virtual private network. In this example, a DAP or service control point is programmed to send the calls to a CCS platform if a busy condition is encountered at the destination.

As a further example, the present invention can be used to continue a call placed to a pager. Once the caller has completed the page, the caller hangs up. When the paged party receives the page, the paged party calls an access number which continues the call placed to the pager to include the caller.

As yet a further example, the present invention can be used to continue a call placed to a destination employing a dial-back security application. Such applications are commonly employed to provide security for a corporate network when a caller calls the network from a remote location. In this example, the caller enters callback information that includes a code or key. A placeholder for the caller is then placed in a call queue. The CCS platform authenticates the caller by querying an internal database with the caller-entered code or key to obtain a pre-approved callback number. The CCS platform then continues the call using that callback number.

In another embodiment, the present invention is used to continue calls placed to an internet service provider (ISP) that is temporarily unavailable (e.g., the ISP has no free inbound lines or modems). For example, a caller's personal computer (PC) uses a modem to dial the access number for an ISP and encounters a busy condition. The modem call is then redirected to a CCS platform. The CCS platform collects callback information for the PC, places the call in a queue, and monitors the availability of the ISP. When the ISP is again available, the CCS platform places calls to the ISP and to the modem and joins the two calls. In one embodiment, the protocol exchange is then reversed to emulate the modem having placed the call.

In another embodiment, the present invention is used to continue telephone calls placed to a cellular phone that is turned off, out of the area, or otherwise unavailable. In a typical cellular telephone system, a database commonly referred to as a home location registry (HLR) is employed to track the status of certain cellular telephones. In this embodiment, when a call to a cellular telephone cannot be completed, the caller can be routed to a CCS platform that communicates with the HLR for the cellular telephone for call continuation. When the cellular telephone again becomes available, the HLR can inform the CCS platform, which then continues the call.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. In a telecommunications network, a system for continuing a call placed by a caller to a destination when the destination is unavailable, comprising:
   means for obtaining callback information for the caller, said callback information including a telephone number where the caller can be reached;
   means for selecting a camp-on method to be employed upon callback from said callback information;
   means for scheduling a callback based on said callback information when no camp-on method is selected;
   means for ending the call placed by the caller;
   means for placing a placeholder for the call placed by the caller that will maintain the caller's place in a call queue upon selection of a camp-on method; and
   wherein a call is initiated based upon said selected camp-on method when said placeholder for the call placed by the caller reaches the front of said call queue.

2. The system of claim 1, wherein said initiated call is to the caller and including means for initiating a further call to the destination; and
   means for joining said call to the caller and said further call to the destination.

3. The system of claim 2, wherein:
   said further call to the destination is placed when the caller accepts said call to the caller.

4. The system of claim 2, wherein:
   said call to the caller is placed when said further call to the destination is answered; and
   said call to the caller and said further call to the destination are joined when the caller accepts said call to the caller.

5. The system of claim 2, wherein said means for joining said call to the caller and said further call to the destination occurs subsequent to said caller accepting said call.

6. The system of claim 2, wherein said means for joining said call to the caller and said further call to the destination occurs subsequent to said destination answering said call.

7. The system of claim 1, wherein the destination is a queuing destination, and wherein:
   said call to the caller is placed at a time selected on the basis of availability of the queuing destination.

8. The system of claim 7, wherein said queuing destination is a call center staffed with at least one agent, and wherein:
   said call to the caller is placed at a time selected on the basis of the availability of the at least one agent.

9. The system of claim 1, further comprising:
   means for obtaining schedule information from the caller, said schedule information including a callback time specifying a time when the call placed by the caller should be continued.

10. The system of claim 9, further comprising:
    means for placing said placeholder for the call placed by the caller in a time queue according to said schedule information; and wherein
    said placeholder for the call placed by the caller is placed in said call queue when said placeholder for the call placed by the caller reaches the front of said time queue.

11. The system of claim 10, wherein said call has a predetermined priority, and wherein:
    said placeholder for the call placed by the caller is placed in said call queue according to the predetermined priority of the call placed by the caller.

12. The system of claim 1, wherein:
    said callback information for the caller is obtained using at least one of ANI and caller-entered digits.

13. The system of claim 1, wherein:
    the call placed by the caller is continued using caller-entered digits.

14. The system of claim 1, wherein:
    the call placed by the caller is continued when the expected wait time for the call placed by the caller exceeds a predetermined duration.

15. In a telecommunications network, a method for continuing a call placed by a caller to a destination when the destination is unavailable, comprising the steps of:
    obtaining callback information for the caller, said callback information including a telephone number where the caller can be reached;
    selecting a camp-on method from a plurality of camp-on methods to be employed upon callback from said callback information;
    scheduling a callback based on said callback information when no camp-on method is selected;
    ending the call placed by the caller;
    placing a placeholder for the call placed by the caller in a call queue upon selection of a camp-on method; and
    initiating a call based upon said selected camp-on method when said placeholder for the call placed by the caller reaches the front of said call queue.

16. The method of claim 15, further comprising initiating said call to the caller and initiating a further call to the destination; and
    joining said call to the caller and said further call to the destination.

17. The method of claim 16, wherein:
    said further call to the destination is placed when the caller accepts said call to the caller.

18. The method of claim 16, wherein:
    said call to the caller is placed when said further call to the destination is answered; and
    said call to the caller and said further call to the destination are joined when the caller accepts said call to the caller.

19. The method of claim 16, further comprising the step of:
    obtaining schedule information from the caller, said schedule information including a callback time specifying a time when the call placed by the caller should be continued.

20. The method of claim 19, further comprising the step of:

placing said placeholder for the call placed by the caller in a time queue according to said schedule information; and wherein said placeholder for the call placed by the caller is placed in said call queue when said placeholder for the call placed by the caller reaches the front of said time queue.

21. The method of claim 20, wherein said call has a predetermined priority, and wherein:

said placeholder for the call placed by the caller is placed in said call queue according to the predetermined priority of the call placed by the caller.

22. The method of claim 16, wherein said step of joining said call to the caller and said further call to the destination occurs subsequent to said caller accepting said call.

23. The method of claim 16, wherein said step of joining said call to the caller and said further call to the destination occurs subsequent to said destination answering said call.

24. The method of claim 15, wherein the destination is a queuing destination, and wherein:

said call to the caller is placed at a time selected on the basis of availability of the queuing destination.

25. The method of claim 24, wherein said queuing destination is a call center staffed with at least one agent, and wherein:

said call to the caller is placed at a time selected on the basis of the availability of the at least one agent.

26. The method of claim 15, wherein:

said callback information for the caller is obtained using at least one of ANI and caller-entered digits.

27. The method of claim 15, wherein:

the call placed by the caller is continued using caller-entered digits.

28. The method of claim 15, wherein:

the call placed by the caller is continued when the expected wait time for the call placed by the caller exceeds a predetermined duration.

29. In a telecommunications network, a method for continuing a call placed by a caller to a destination when the initial destination is unavailable, comprising the steps of:

directing the call to an enhanced call router for rule based query of alternate destinations;

parking the call at a call continuation platform if an alternate destination is unavailable;

enabling the caller to select a camp-on or scheduled call continuation if expected call wait exceeds a predetermined parameter;

obtaining callback information from the caller for the parked call if the caller selects a scheduled call continuation, said callback information including a telephone number where the caller can be reached;

scheduling a callback based on said callback information when scheduled call continuation is selected, and then ending the call placed by the caller; or selecting a camp-on method from a plurality of camp-on methods that may be employed in the event the caller selects a camp-on continuation;

placing a placeholder for the call placed by the caller in a call queue upon selection of a camp-on continuation, said camp-on method maintaining the call position in the queue; and initiating a call based upon said selected camp-on method when said placeholder for the call placed by the caller reaches the front of said call queue.

30. In a telecommunications network, a method for continuing a call as claimed in claim 29, wherein said enhanced call router continuously monitors the availability of a plurality of alternate destinations when camp-on call continuation is selected.

31. In a telecommunications network, a method for continuing a call as claimed in claim 29, wherein said plurality of camp-on methods include predictive call continuation, caller on-line continuation and destination on line continuation.

32. In a telecommunications network, a method for continuing a call as claimed in claim 31, wherein the call continuation platform initiates the call back to the caller, and then joins the caller to the destination.

* * * * *